US012793114B2

(12) United States Patent
Brannan et al.

(10) Patent No.: US 12,793,114 B2
(45) Date of Patent: *Nov. 10, 2026

(54) VEHICLE TELEMATICS SYSTEMS AND METHODS FOR DETERMINING VEHICLE OPERATIONS RELATIVE TO OPERATIONAL PARAMETERS

(71) Applicant: State Farm Mutual Automobile Insurance Company, Bloomington, IL (US)

(72) Inventors: Joseph R. Brannan, Bloomington, IL (US); Benjamin J. Tucker, Le Roy, IL (US); Ryan M. Gross, Normal, IL (US); Michael A. Myers, Heyworth, IL (US); Darwin G. Beachy, Hopedale, IL (US); M. Eric Riley, Sr., Heyworth, IL (US); Brian N. Harvey, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/932,168

(22) Filed: Oct. 30, 2024

(65) Prior Publication Data

US 2025/0054041 A1 Feb. 13, 2025

Related U.S. Application Data

(63) Continuation of application No. 18/472,909, filed on Sep. 22, 2023, now Pat. No. 12,159,304, which is a (Continued)

(51) Int. Cl.

*G06Q 30/0601* (2023.01)
*G06Q 10/20* (2023.01)

(Continued)

(52) U.S. Cl.

CPC ......... *G06Q 30/0627* (2013.01); *G06Q 10/20* (2013.01); *G06Q 30/0283* (2013.01); *G06Q 30/0629* (2013.01); *G07C 5/008* (2013.01)

(58) Field of Classification Search

CPC . G06Q 30/0627; G06Q 10/20; G06Q 30/0283
See application file for complete search history.

(56) References Cited

U.S. PATENT DOCUMENTS 9,311,271 B2 4/2016 Wright
9,633,487 B2 4/2017 Wright (Continued)

FOREIGN PATENT DOCUMENTS

EP 3239686 A1 11/2017
EP 3578433 B1 8/2020

(Continued)

OTHER PUBLICATIONS

J. Wahlström, I. Skog and P. Händel, "Smartphone-Based Vehicle Telematics: A Ten-Year Anniversary," in IEEE Transactions on Intelligent Transportation Systems, vol. 18, No. 10, pp. 2802-2825, Oct. 2017 (Year: 2017).*

(Continued)

*Primary Examiner* — Michael Misiaszek
(74) *Attorney, Agent, or Firm* — Armstrong Teasdale LLP

(57) ABSTRACT

Provided herein is a computing system including a processor in communication with at least one memory. The processor is configured to (i) build a model using historical vehicle telematics data and historical vehicle data, the model configured to: (a) predict an operating cost of a vehicle based upon a vehicle type and user data and (b) output operational parameters for operating the vehicle, (ii) receive a vehicle acquisition request for a selected vehicle including vehicle data for the selected vehicle and selected user data for the user of the selected vehicle, (iii) input the vehicle acquisition (Continued)

request data into the model, and (iv) output from the model an acquisition cost and operational parameters for the selected vehicle and the selected user including a procurement cost for the selected vehicle and an operating cost for operating the selected vehicle within the operational parameters for a predetermined time period.

20 Claims, 7 Drawing Sheets

Related U.S. Application Data continuation of application No. 17/147,209, filed on Jan. 12, 2021, now Pat. No. 11,798,055.

(51) Int. Cl.

*G06Q 30/0283* (2023.01)
*G07C 5/00* (2006.01)

(56) References Cited

U.S. PATENT DOCUMENTS

| | | | | |
|---|---|---|---|---|
| 9,727,905 | B2 * | 8/2017 | Swinson | G06Q 30/0625 |
| 9,830,665 | B1 * | 11/2017 | Healy | B60W 40/09 |
| 9,830,748 | B2 | 11/2017 | Rosenbaum | |
| 9,990,782 | B2 | 6/2018 | Rosenbaum | |
| 10,118,487 | B1 * | 11/2018 | Riley, Sr. | A61B 5/18 |
| 10,192,369 | B2 | 1/2019 | Wright | |
| 10,198,879 | B2 | 2/2019 | Wright | |
| 10,269,190 | B2 | 4/2019 | Rosenbaum | |
| 10,467,824 | B2 | 11/2019 | Rosenbaum | |
| 10,580,080 | B2 | 3/2020 | Rackley, III et al. | |
| 11,227,452 | B2 | 1/2022 | Rosenbaum | |
| 11,407,410 | B2 * | 8/2022 | Rosenbaum | B60W 30/0953 |
| 11,524,707 | B2 | 12/2022 | Rosenbaum | |
| 11,594,083 | B1 | 2/2023 | Rosenbaum | |
| 2007/0136162 | A1 | 6/2007 | Thibodeau et al. | |
| 2007/0179798 | A1 | 8/2007 | Inbarajan | |
| 2015/0213420 | A1 * | 7/2015 | Krishnamurthy | G06Q 20/10 705/39 |
| 2015/0246654 | A1 | 9/2015 | Tadic et al. | |
| 2018/0268621 | A1 | 9/2018 | Oz et al. | |
| 2019/0251759 | A1 * | 8/2019 | Lora | H04W 4/44 |
| 2020/0216079 | A1 * | 7/2020 | Mahajan | B60W 60/0051 |
| 2021/0241138 | A1 * | 8/2021 | Meroux | G06Q 10/20 |
| 2022/0092893 | A1 | 3/2022 | Rosenbaum | |
| 2022/0340148 | A1 | 10/2022 | Rosenbaum | |
| 2023/0060300 | A1 | 3/2023 | Rosenbaum | |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |
| JP | 2018180643 | A | 11/2018 |

OTHER PUBLICATIONS

Boon-Giin Lee et al., "A Smartphone-Based Driver Safety Monitoring System Using Data Fusion", Department of Electronic Engineering, Pukyong National University, Busan 608-737, Korea, Sensors, 2012, 12, pp. 17536-17552.

* cited by examiner

600

Costs

| | |
|---|---|
| Procurement Cost | $450 |
| Maintenance Cost | $100 |
| Insurance Cost | $75 |

Parameters

1,250 Miles Driven
 Add $10 for each additional 20 miles
10 Electrical Charges at Paid Charging Stations
 Driver responsible for cost of additional charges
10 Undesirable Driving Events
 Add $2 per additional event
0 Off-Road Driving Events
 Add $100 per additional event
20% of Drive Time in Autonomous/Semi-Autonomous Mode
 Add $50 if less, subtract $20 if more
Operated During Summer, Fall, or Spring
 Add $20 for winter operation
Operated on Flat Terrain with Few Inclines
 Add $10 for inclined operation

Acquiring Cost: $625/mo

FIGURE 6A

610

Costs

| | |
|---|---|
| Procurement Cost | $450 |
| Maintenance Cost | $260 |
| Insurance Cost | $100 |

Parameters

1,670 Miles Driven
 Add $10 for each additional 10 miles
5 Gas Tank Fill-Ups – Prepaid Card
 Driver responsible for cost of additional fill-ups
30 Undesirable Driving Events
 Add $5 per additional event
1 Off-Road Driving Events
 Add $75 per additional event, subtract $100 if less
Operated During Summer, Fall, or Spring
 Add $35 for winter operation
Operated on Flat Terrain with Few Inclines
 Add $50 for inclined operation

Acquiring Cost: $810/mo

FIGURE 6B

VEHICLE TELEMATICS SYSTEMS AND METHODS FOR DETERMINING VEHICLE OPERATIONS RELATIVE TO OPERATIONAL PARAMETERS

CROSS-REFERENCE TO RELATED APPLICATIONS

This application is a continuation of, and claims the benefit of priority to, U.S. patent application Ser. No. 18/472,909, filed Sep. 22, 2023 and entitled "VEHICLE TELEMATICS SYSTEMS AND METHODS," which is a continuation of, and claims the benefit of priority to, U.S. patent application Ser. No. 17/147,209, filed Jan. 12, 2021 and entitled "VEHICLE TELEMATICS SYSTEMS AND METHODS," the entire contents and disclosures of which are hereby incorporated herein by reference in their entirety.

FIELD OF THE DISCLOSURE

The present disclosure relates to systems and methods for collecting vehicle telematics data, and more specifically, to network-based systems and methods for collecting vehicle telematics data, building a model based on the collected telematics data, and determining an acquiring cost of a vehicle for a predetermined time period based upon the model.

BACKGROUND

Modern automobiles may be equipped with electronic devices that are capable of generating vehicle telematics data. For example, vehicle telematics data may be collected by vehicle mounted navigation systems (e.g., GPS receivers), integrated hands-free mobile communications systems, and the like. In some cases, collected telematics data may be used to provide auto insurance discounts for risk-averse drivers.

At least some vehicle manufacturers have also included maintenance plans with the purchase or leasing of a vehicle. A user may opt-in to a vehicle maintenance plan and pay a periodic maintenance cost (e.g., monthly, bi-monthly, semi-yearly, yearly, etc.). However, these known maintenance plans are typically a "one size fits all" type of plan. For example, these known plans are usually priced to cover standard or expected maintenance for the vehicle, or are priced to cover "worse-case" scenarios above and beyond normal vehicle wear and tear. That is, these known maintenance plans are not tailored to how each user actually uses their vehicle, and these maintenance plans do not include predefined vehicle operational parameters that, if satisfied by the user, enable the user to save additional money.

BRIEF SUMMARY

The present embodiments relate to systems and methods for utilizing historical data, and more specifically, historical vehicle telematics data received from one or more sensors associated with a vehicle and historical vehicle data, to build a model to determine an acquiring cost of the vehicle for a predetermined time period. The acquiring cost may include a procurement cost of the vehicle (e.g., a price to buy or lease the vehicle and any financing costs associated with buying or leasing the vehicle) and an operations cost (e.g., insurance costs, maintenance costs, and other costs associated with operating the vehicle) for operating the vehicle. Further, certain parameters may be predefined by the seller or manufacturer of the vehicle as part of the operations costs, and thus, also part of the acquiring costs. For example, some of the predefined parameters may include (i) a predetermined number of electrical charges or gas tank fill-ups, (ii) a maximum number of undesirable driving events, the undesirable driving events including at least one of a hard braking event, a hard cornering event, and a hard acceleration event, (iii) a maximum number of off-road events, (iv) if the vehicle is an autonomous or semi-autonomous vehicle, a maximum amount of time the vehicle is set to a non-autonomous mode, (v) one or more seasons in which the vehicle is being operated during the predetermined time period, (vi) one or more terrains in which the vehicle is being operated during the predetermined time period, (vii) a maximum number of miles driven by the vehicle during the predetermined time period, and (viii) a maximum number of racetrack driving events. Accordingly, the present embodiments allow a user wishing to acquire a vehicle to pay the acquiring cost which covers all costs associated with the vehicle over the predetermined time period if the vehicle is operated within the parameters associated with the acquiring cost.

In one aspect, a computing system including a processor in communication with at least one memory may be provided. The processor may be configured to: (i) build a model using historical vehicle telematics data and historical vehicle data, the model configured to: (a) predict an operating cost of a vehicle based upon a vehicle type and user data and (b) output operational parameters for operating the vehicle, (ii) receive a vehicle acquisition request for a selected vehicle, the vehicle acquisition request including vehicle data for the selected vehicle and selected user data for the user of the selected vehicle, (iii) input the vehicle acquisition request data into the model for the selected vehicle, and/or (iv) output from the model an acquisition cost and operational parameters for the selected vehicle and the selected user, the acquisition cost including a procurement cost for the selected vehicle and an operating cost for operating the selected vehicle within the operational parameters and for a predetermined time period. The computer system may include additional, less, or alternate functionality, including that discussed elsewhere herein.

In another aspect, a computer-implemented method implemented by a computing system including a processor in communication with at least one memory may be provided. The method may include: (i) building a model using historical vehicle telematics data and historical vehicle data, the model configured to: (a) predict an operating cost of a vehicle based upon a vehicle type and user data and (b) output operational parameters for operating the vehicle, (ii) receiving a vehicle acquisition request for a selected vehicle, the vehicle acquisition request including vehicle data for the selected vehicle and selected user data for the user of the selected vehicle, (iii) inputting the vehicle acquisition request data into the model for the selected vehicle, and/or (iv) outputting from the model an acquisition cost and operational parameters for the selected vehicle and the selected user, the acquisition cost including a procurement cost for the selected vehicle and an operating cost for operating the selected vehicle within the operational parameters and for a predetermined time period. The method may include additional, less, or alternate actions, including those discussed elsewhere herein.

In yet another aspect, at least one non-transitory computer-readable storage media having computer-executable instructions embodied thereon may be provided. When executed by at least one processor in communication with at least one memory device, the computer-executable instructions may cause the processor to: (i) build a model using historical vehicle telematics data and historical vehicle data, the model configured to: (a) predict an operating cost of a vehicle based upon a vehicle type and user data and (b) output operational parameters for operating the vehicle, (ii) receive a vehicle acquisition request for a selected vehicle, the vehicle acquisition request including vehicle data for the selected vehicle and selected user data for the user of the selected vehicle, (iii) input the vehicle acquisition request data into the model for the selected vehicle, and/or (iv) output from the model an acquisition cost and operational parameters for the selected vehicle and the selected user, the acquisition cost including a procurement cost for the selected vehicle and an operating cost for operating the selected vehicle within the operational parameters and for a predetermined time period. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIGS. 6A and 6B illustrate example parameter lists output by the exemplary computer system shown in FIG. 1.

Figure 1:
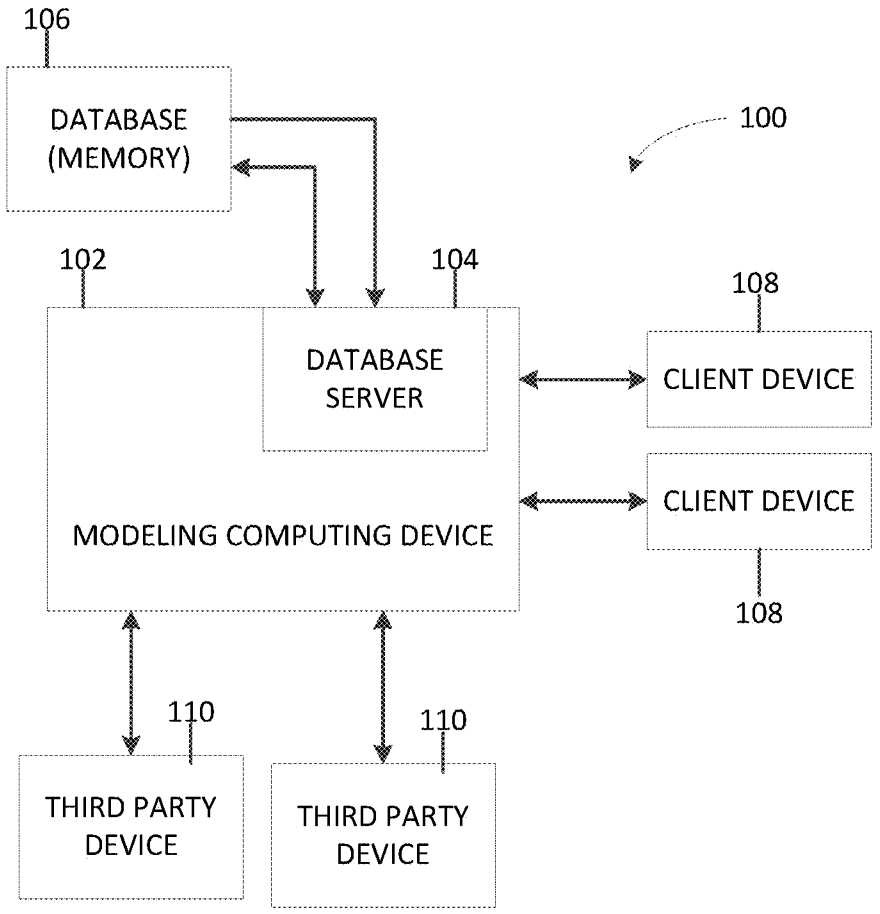
FIG. 1 illustrates an exemplary computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for utilizing historical data, and more specifically, historical telematics data received from one or more sensors associated with a vehicle and historical vehicle data, to build a model to determine an acquiring cost of a vehicle for a predetermined time period. In one exemplary embodiment, the process may be performed by a modeling computing device (also referred to herein as a modeling server or a modeling computer system). In some embodiments, the modeling computing device may be associated with an insurance provider, a vehicle manufacturer, or another third party having access to historical telematics data.

In at least some embodiments, a user may acquire (e.g., purchase, lease, etc.) a vehicle. A vehicle seller, manufacturer, lessor, or other entity associated with the vehicle may offer the user an "all-in-one" vehicle payment plan, which covers a plurality of costs associated with the use (e.g., ownership, leasing, etc.) of the vehicle. For example, the vehicle payment plan may include costs associated with: (i) a procurement price of the vehicle (e.g., a purchase price, lease cost, subscription fee, etc.); (ii) any applicable financing costs (e.g., an interest on a vehicle loan); (iii) maintenance costs; (iv) fuel costs (e.g., costs for fuel, electric charging, batteries, and/or any other fuel source); (v) insurance costs, and/or (vi) any other costs associated with the operations of the vehicle.

In the exemplary embodiment, one or more of the above costs may be fixed (e.g., the price of the vehicle, financing costs, etc.) and one or more of the above costs may be variable based upon operation of the vehicle (e.g., the maintenance cost, the charging cost). As used herein, operation of the vehicle includes the user's driving behavior as well as operation of the vehicle by any other user (e.g., a spouse or partner, a child, a co-lessee, etc.).

In the exemplary embodiment, the modeling computing device builds a model that predicts the operations costs of vehicles for a predetermined time period (e.g., a month, every two months, bi-annually, annually) using historical data (e.g., vehicle telematics data and vehicle data) from a plurality of vehicles and/or historical data from one or more vehicle associated with a driver wishing to acquire a new vehicle, as described further herein. Using the predicted operations cost, the modeling computing device determines an acquiring cost for the predetermined time period that incorporates the procurement price of the vehicle (e.g., the fixed costs of the vehicle) and the operations cost of the vehicle (e.g., the variable costs of the vehicle) into a single price.

The acquiring cost may include parameters (referred to herein as both "parameters" and "operational parameters") associated with how the vehicle is operated. The parameters may include, for example, (i) a predetermined number of electrical charges or gas tank fill-ups, (ii) a maximum number of undesirable driving events, the undesirable driving events including at least one of a hard braking event, a hard cornering event, and a hard acceleration event, (iii) a maximum number of off-road events, (iv) if the vehicle is an autonomous or semi-autonomous vehicle, a maximum amount of time the vehicle is set to a non-autonomous mode, (v) one or more seasons in which the vehicle is being operated during the predetermined time period, (vi) one or more terrains in which the vehicle is being operated during the predetermined time period, (vii) a maximum number of miles driven by the vehicle during the predetermined time period, and (viii) a maximum number of racetrack driving events. If the vehicle is operated within the predefined parameters over the predetermined time period, the user only pays the acquiring cost and may even be rewarded for operating the vehicle within the parameters. If the vehicle is operated outside of at least one of the parameters during the predetermined time period, the modeling computing device may determine an additional cost that the user may be required to pay. The additional cost may account for additional maintenance required for the vehicle based upon the vehicle being operated outside of the parameters.

Further, the modeling computing device monitors current telematics data and other vehicle data of the vehicle to determine whether the vehicle is being operated within the parameters included in the acquiring cost. If the vehicle is close to being operated outside of the parameters, the modeling computing device may transmit a notification to the user of the vehicle.

As used herein, "user" refers to a party associated with a subject vehicle, such as owners, drivers, and/or passengers. For example, users may include an owner of a subject vehicle, a lessee of a subject vehicle, a driver of a subject vehicle, and the like. Any number of drivers may be associated with a single subject vehicle. In some cases, a user may refer to a primary user responsible for some or all of the payment(s) associated with a subject vehicle.

"Vehicle," as used herein, may refer generally to any vehicle owned, operated, and/or used by one or more vehicle users. A vehicle may include any kind of vehicle, such as, for example, cars, trucks, all-terrain vehicles (ATVs), motorcycles, recreational vehicles (RVs), snowmobiles, boats, autonomous vehicles, semi-autonomous vehicles, commercial vehicles (e.g., trucking), industrial vehicles (e.g., construction vehicles), "riding" lawnmowers, planes, and/or any kind of land-, water-, or air-based vehicle.

Receiving Historical Data

In an exemplary embodiment, the modeling computing device receives historical telematics data and historical vehicle data associated with a plurality of vehicles and/or historical telematics data and historical vehicle data associated with one or more vehicles of a driver wishing to acquire a new vehicle.

As used herein, "vehicle telematics data" is any data associated with operation of a vehicle including one or more vehicle components, such as acceleration, braking, cornering, vehicle mileage, a tread depth of one or more vehicle tires, an environmental sensor reading, vehicle oil and fluid levels, tire pressure, tire temperature, vehicle brake pad thicknesses, and the like. Additionally or alternatively, vehicle telematics data may include data captured by a vehicle component, such as environmental data (e.g., temperature, humidity) or contextual data (e.g., location, on-road vs. off-road driving).

In some embodiments, vehicle telematics data may be collected by one or more sensors mounted on a vehicle, installed within a vehicle, and/or included in a user device of the user of a vehicle. Such sensors may be configured to monitor a vehicle component and may provide vehicle telematics data collected in conjunction with a particular vehicle component to the system. In certain embodiments, the sensors may be configured to monitor environmental factors, such as temperature, humidity, acceleration, and the like. The sensors may include, for example, accelerometers, gyroscopes, and global positioning system (GPS) sensors, and the sensors may also monitor a location of the vehicle (e.g., to determine whether the vehicle is "on-road" or "off-road," what the weather conditions are in the location of the vehicle, whether the vehicle is at a charging station or a gas pump, etc.). The historical vehicle telematics data may be directly transmitted to the modeling computing device (e.g., from a user computing device) and/or stored in a database of the modeling computing device.

As used herein, "vehicle data" or "vehicle type data" is any data associated with a vehicle or a user of the vehicle and may include, for example, vehicle year, make, and model data and safety features included thereon, user data associated with a user of each of the plurality of vehicles, and historical operating costs including maintenance costs associated with each of the plurality of vehicles.

As used herein, a "vehicle component" may be any component or part of a vehicle, such as, for example, and without limitation, one or more vehicle tires, a vehicle oil filter and/or a vehicle lubricant, such as vehicle motor oil, vehicle fluids, electronic vehicle components, autonomous vehicle systems, vehicle brake pads, transmission, clutch, drivetrain, sensors (such as smart vehicle sensors or autonomous vehicle sensors), and the like.

The historical vehicle data may be stored in a database of the modeling computing device and/or may be retrieved from one or more third party databases. For example, industry vehicle maintenance data may be provided by vehicle manufacturers, dealerships, service providers, and the like. The industry vehicle maintenance data may include vehicle and/or vehicle component life expectancy data, replacement cycle data, vehicle component cost data (e.g., repair costs, replacement costs), vehicle labor rates, and the like. In certain embodiments, industry vehicle maintenance data may be retrieved from a database and/or specifically requested from an industry data source (e.g., for a particular make/model of vehicle). Additionally, charging data (e.g., for any fuel source including electricity and gasoline) may be provided by a plurality of charging stations or gas stations. The charging data may include charging frequency, duration, location, and the like, for vehicles.

The historical vehicle data may also include user data associated with the users of the plurality of vehicles. The user data may include, for example, a driving history of the users (e.g., driving records including accidents and speeding tickets, insurance records including claims and rates, etc.) and a user profile including how the users of the vehicle typically operate the vehicles.

Building a Model Based Upon the Historical Data

In the exemplary embodiment, the modeling computing device uses the historical data (e.g., the historical telematics and vehicle data) to generate a model that predicts an operating cost of a vehicle based upon the type of vehicle (e.g., a sports car, sedan, electric car, hybrid car, passenger van, SUV, etc.). In some embodiments, the predicted operating cost is determined based upon operating costs that may be incurred over a time period when the vehicle is operated in a standard, typical, or expected fashion (e.g., when the vehicle is operated in line with vehicles of similar types and/or manufacturers are operated, as determined using the historical telematics data). In other embodiments, the predicted operating cost is determined based upon operating costs that may be incurred over a time period when the vehicle is operated in a preferred manner, as provided by a vehicle manufacturer, insurer, and/or dealer. The predicted operating cost may incorporate industry vehicle maintenance data including costs for maintenance, repair, and/or replacement of various vehicle components and costs associated with charging (e.g., with electrical power or gasoline) the vehicle. The operating cost may also account for differences in location in associating costs with maintenance and charging. For example, vehicle maintenance and charging may cost more in a large city than a small town.

Further, the model, as generated by the modeling computing device, may determine operating costs associated with particular operations outside of the scope of typical vehicle operation and/or preferred vehicle operation. For example, the model may predict the operating costs associated with "off-road" driving, undesirable driving events (e.g., hard braking, hard accelerations, fast cornering, etc.), operating an autonomous or semi-autonomous vehicle in an autonomous mode versus a manual mode, and operating the vehicle in the winter versus the spring or summer. The operating costs associated with these particular operations may be substantially higher than operating costs of a vehicle operated in a typical way due to excess wear and tear and maintenance associated with the operations outside of the scope of typical and/or preferred vehicle operation.

For example, the model may determine that a single off-road driving event (e.g., on a track or gravel road) costs about $100 in maintenance for a sports car. The extra cost associated with the off-road driving event may be due to the extra wear and tear on the tires of the car, extra wear and tear on the transmission, and/or extra charges needed during the off-road event. Further, for example, the model may determine that operating a sports car in the winter costs $50 more per month than operating the sports car in the summer. The extra cost associated with operating the sports car in the winter may be due to the extra wear and tear on the tires, transmission, and/or engine of the car as well as additional electric charges needed (e.g., due to having to keep the car warm).

"On-road" versus "off-road" driving may have differing impacts on various vehicle components. "On-road" driving may refer generally to driving a subject vehicle on a paved road, whereas "off-road" driving may refer generally to driving a subject vehicle on non-paved terrain, such as gravel roads or non-road terrain. Driving off-road may increase the wear on, for example, vehicle tires, wheels, suspension systems, and the like.

"Autonomous vehicle," as used herein, may refer generally to any vehicle that has at least one automation system that is related to the piloting of the vehicle (e.g., warning systems assisting in a piloting task, intervention systems performing a piloting task, control systems performing a piloting task). The term "unautomated vehicle" refers to vehicles in which no automation systems are present (e.g., the vehicle is being piloted by the full-time performance of a human driver, and without enhancements from warning or intervention systems). The terms "semi-autonomous vehicle" and "autonomous vehicle" may be used interchangeably in some instances, and the term "autonomous vehicle" may be used to refer to both semi-autonomous vehicles and autonomous vehicles for purposes of convenience.

Automation systems may include, for example, rear-view sensors and alarms (e.g., to detect obstacles while in reverse), anti-lock braking systems (e.g., to prevent wheel locking during deceleration), traction control systems (e.g., actuating brakes or reducing throttle to restore traction if wheels begin to spin), electronic stability control and acceleration slip regulation (e.g., to prevent the car from understeering or oversteering), dynamic steering response (e.g., to correct the rate of power steering based upon road conditions), cruise control (e.g., to maintain vehicle speed), autonomous cruise control (e.g., to adjust cruising speed to maintain safe distance from vehicles ahead), lane departure systems (e.g., to alert the driver or adjust steering to keep the vehicle in its current lane), driver monitoring systems (e.g., to warn drivers when they become drowsy or fall asleep), adaptive headlamps (e.g., to alter the brightness or angle of headlamps), collision avoidance systems (e.g., to warn the driver an impending collision or adjust steering to avoid impending collision), parking assistance systems, blind spot monitoring systems, traffic sign recognition systems, dead man's switch systems, computer vision systems, location determination systems (e.g., GPS), and navigation systems (e.g., to navigate or assist in navigating the vehicle to a destination).

Accordingly, in the exemplary embodiment, a computer system (e.g., the modeling computing device) for generating operating cost models based upon historical data, including historical vehicle telematics data, may receive telematics data from a vehicle and apply those models to determine an operating cost and/or an acquisition cost of a vehicle. The modeling computing device may use any suitable machine learning and/or artificial intelligence techniques to generate the model.

Determining an Acquisition Price and Associated Parameters for a New Vehicle Acquisition When a user wishes to acquire a vehicle through buying or leasing, a vehicle acquisition request may be transmitted to the modeling computing device. The vehicle acquisition request may include vehicle data of the vehicle (e.g., make, model, and vehicle type), user data of the user (e.g., a user profile including historical telematics data of the user and how the user typically operates vehicles, demographics data, etc.), fixed cost data (e.g., procurement price data, financing data, insurance price data, etc.), third party data (e.g., preferred operating parameters), and any other relevant data associated with the vehicle and/or the user. In some embodiments, the user may submit the vehicle acquisition request to a third party (e.g., an insurer of the vehicle and/or user, a manufacturer of the vehicle, a dealership from which the user would like to acquire the vehicle, etc.), and the third party may transmit the vehicle acquisition request to the modeling computing device (e.g., through a third party computing device). In other embodiments, the user may transmit the vehicle acquisition request directly to the modeling computing device, or the modeling computing device may retrieve the vehicle acquisition request from a database.

The modeling computing device inputs the vehicle acquisition request data into the model, generated as described above, to determine an operating cost for the vehicle included in the vehicle acquisition request. That is, the data included in the vehicle acquisition request is input into the model, and an operating cost for the vehicle is output by the model. For example, the modeling computing device may use the model to determine the historical operating costs of similar vehicles (e.g., having the same type, model, manufacturer, etc.) and predict the operating cost of the current vehicle based on the determinations. In the exemplary embodiment, the modeling computing device combines the fixed costs associated with the vehicle acquisition (e.g., procurement cost, financing costs, insurance costs, etc.) with the predicted operating costs to determine a total acquisition cost for the vehicle. The fixed costs may be included in the vehicle acquisition request, the modeling computing device may determine the fixed costs, and/or the modeling computing device may retrieve the fixed costs from the manufacturer, the insurer, and/or the dealership. The acquisition cost is determined by the modeling computing device for a predetermined time period. For example, the predetermined time period may be a month, two months, six months, a year, etc.

Further, the modeling computing device outputs parameters associated with how the vehicle is operated included in the determined operating cost. That is, the determined operating cost is the actual operating cost as long as the vehicle is operated within the parameters output with the determined operating cost. The parameters may include, for example, (i) a predetermined number of electrical charges or gas tank fill-ups, (ii) a maximum number of undesirable driving events, the undesirable driving events including at least one of a hard braking event, a hard cornering event, and a hard acceleration event, (iii) a maximum number of off-road events, (iv) if the vehicle is an autonomous or semi-autonomous vehicle, a maximum amount of time the vehicle is set to a non-autonomous mode, (v) one or more seasons in which the vehicle is being operated during the predetermined time period, (vi) one or more terrains in which the vehicle is being operated during the predetermined time period, (vii) a maximum number of miles driven by the vehicle during the predetermined time period, and (viii) a maximum number of racetrack driving events. The parameters may be determined by the modeling computing device based upon how similar vehicles were historically operated, input by the user, and/or input by a third party (e.g., the insurer, manufacturer, and/or dealership). For example, the parameters may be a preferred list of parameters within which the third party wishes that the vehicle be operated.

In the exemplary embodiment, the modeling computing device may output the acquisition cost and the associated parameters to the user (e.g., through a user computing device of the user). For example, the modeling computing device may output the operating cost and/or acquisition cost to the user with the associated parameters listed as a list or a "menu." The modeling computing device may prompt the user to adjust the parameters and/or accept the acquisition cost and associated parameters. If the user adjusts the associated parameters, the modeling computing device adjusts the acquisition cost based upon the adjustments.

For example, a vehicle acquisition request may be submitted by a user where the user would like to lease the car from a manufacturer dealership monthly. The modeling computing device may input the vehicle acquisition request and all associated data into the model and a predicted operating cost for the car may be output by the modeling computing device. The modeling computing device may combine fixed costs associated with the car with the predicted operating cost to determine an acquisition cost for the car. The modeling computing device may also determine parameters associated with the acquisition cost (e.g., as requested by the insurer, dealership, and/or manufacturer). For example, the modeling computing device may determine that the acquisition cost for the car is $600 per month as long as the car is operated within the parameters of: (i) having no more than two electrical charges or gas tank fill-ups, (ii) having no more than five undesirable driving events including hard braking events, fast cornering events, and hard acceleration events, (iii) no off-road events, (iv) using all autonomous or semi-autonomous features of the car when parking and driving, and (v) operating the car in any season except for winter. If the user agrees with the acquisition cost and associated parameters, the user can accept the acquisition cost and associated parameters and work with the dealership to complete the transaction. However, if the user has an over 50 mile commute each day, would like to take the car off-road, and would like to operate the car in winter, the user may adjust the parameters. For example, the user may adjust the parameters to include four electrical charges or gas tank fill-ups, one off-road driving event, and operated during winter. Based upon the adjusted parameters, the modeling computing device may determine that the acquisition cost for the user is $800. The user may adjust the parameters any number of times before the user agrees to the acquisition cost and associated parameters.

Once the user accepts the acquisition cost and associated parameters, the modeling computing device may store, in a memory device, the acquisition cost and associated parameters for the user, and the user and the dealership, manufacturer, and/or insurer may complete the acquisition transaction. In some embodiments, the dealership and/or manufacturer may handle all maintenance for the vehicle (e.g., tire rotations, tire replacements, oil changes, etc.). In other embodiments, the user may receive a prepaid card and/or digital wallet credit such that the user can have the vehicle maintenance preformed at any service center. Further, the user may receive a prepaid card and/or digital wallet credit such that the user can charge or fuel the vehicle as determined in the parameters. For example, if it is predicted that each fill-up of the vehicle costs $20 and two fill-ups are included within the parameters, the user may receive a $40 prepaid card each month restricted to fuel purchases. If 15 electrical charges are included within the parameters, 15 electrical charge credits may be received by the user (e.g., through the user device) to redeem at electrical charging stations.

In some embodiments, the user may be a single user planning to use the vehicle for personal use. In other embodiments, the user may be a manager or other employee of a company providing a fleet of vehicles for business-related uses. In these embodiments, the parameters that the manager accepts may be for all the vehicles that the company wishes to provide. For example, if the company wishes to acquire 15 new vehicles for the company fleet, the modeling computing device may output a cost and parameters associated with 15 vehicles instead of a single vehicle. Accordingly, the manager may accept the parameters for the 15 vehicles, and the parameters may be split between the 15 vehicles evenly and/or based upon expected usage of the 15 vehicles.

Through providing the acquisition cost and associated parameters, the modeling computing device allows users and third parties (e.g., manufacturers, dealerships, and/or insurers) to determine an all-inclusive subscription price for the user as long as the user operates the vehicle within the associated parameters. Accordingly, the user does not have to worry about budgeting for maintenance of the vehicle, and third parties can incentivize the user to operate the vehicle within preferred parameters.

Monitoring Current Vehicle Operation Within the Parameters

According to the present disclosure, when a user has opted-in or accepted the acquisition cost and associated parameters, which are stored by the modeling computing device, vehicle telematics data may be collected during all operation of the subject vehicle, by one or more client devices, as described above. The vehicle telematics data may be transmitted to the modeling computing device such that the modeling computing device may determine whether the user is staying within the parameters. That is, the modeling computing device may compare the current vehicle telematics received from the one or more client devices to the stored acquisition cost and associated parameters for the user to determine whether the user is operating the vehicle within the stored parameters. The vehicle telematics data may be transmitted to the modeling computing device after each trip taken using the subject vehicle and/or on a periodic basis (e.g., at a specific time each day, each week, each month, etc.).

For example, vehicle telematics data such as GPS systems, vehicle suspension sensors, vehicle tire or wheel sensors, and the like, may indicate that a subject vehicle is being operated off-road. In at least some embodiments, the modeling computing device may access a geofencing database that defines whether, based on a location of a subject vehicle, the subject vehicle is being operated in an on-road or off-road location. If the modeling computing device determines that vehicle is being operated off-road, the modeling computing device may track and store the number of times that the vehicle is operated off-road over the predetermined time period.

Further, the modeling computing device may use vehicle telematics data like the GPS system to determine when the vehicle is at a gas station or charging station (e.g., using reference gas station and charging station locations). If, for example, the modeling computing device determines that the vehicle is at a gas station, the modeling computing device may count the gas station stop as a used charge/fill-up. If the modeling computing device determines that the vehicle is at a charging station, the modeling computing device may count the charge station stop as a used charge/fill-up. However, if the modeling computing device determines that the vehicle is at a free charging station (e.g., in a public parking lot), the modeling computing device may not count the stop at the charging station as a used charge/fill-up.

In the exemplary embodiment, the modeling computing device may also provide an interface (e.g., a "dashboard") through which a user may access reports, add or update user preferences, select which vehicle telematics data may be generated by and/or received from their client device (e.g., a smart phone), and the like. The dashboard may be provided as a web-based interface, such as a smartphone "app" and/or as a webpage provided to any suitable computing device, such as a client device.

Further, the modeling computing device may keep track of the vehicle telematics of the user and/or vehicle over the predetermined time. If the modeling computing device determines that the user is close to going outside of the parameters, the modeling computing device may transmit a notification (e.g., an email notification, a text message notification, a push button notification, a notification sent to a dashboard or user interface of the vehicle, etc.) to the user to notify the user. For example, if the modeling computing device determines that the user has used three charges out of four included in the parameters, the modeling computing device may transmit a notification to the user notifying the user that another charge will be the last charge included in the parameters.

The modeling computing device may also track the vehicle telematics of the user and/or vehicle to determine if the user is operating the vehicle at a level that is below the parameters. For example, the modeling computing device may determine, from the vehicle telematics, that the vehicle has only been driven half as many miles as the vehicle typically has during the predetermined time. Accordingly, the modeling computing device may transmit a notification to the user that if the user keeps up the current operation of the vehicle, the user may be rewarded with a discount, reward, or other compensation for operating the vehicle well below the parameters.

Determining Additional Costs Based Upon Vehicle Operation

If the modeling computing device determines that the user has gone outside of the determined parameters, the modeling computing device determines an additional cost that the user has to pay based upon the user going outside of the determined parameters.

It should be readily understood that utilizing the model to determine operations and/or acquisition costs and associated parameters may be applicable in any vehicle ownership and/or usage situation, such as a standard vehicle purchase that incorporates operations costs into a periodic payment. The models are also applicable to vehicle leasing situations, as well as vehicle subscription and/or shared-use situations.

Exemplary technical effects of the systems and methods described herein may include, for example: (a) receiving and processing vehicle telematics data and other data; (b) building a model to predict an acquisition cost of a vehicle for a predetermined time period based upon the received and processed vehicle telematics data and other data; (c) outputting, using the model an acquisition cost and associated parameters for a new vehicle; (d) determining, based upon telematics data of the new vehicle, whether the vehicle is operated within the parameters associated with the acquisition cost; and (e) determining additional costs if the vehicle is operated outside of the parameters.

The present disclosure facilitates using vehicle telematics and/or sensor data—and/or data collected by an attached device (e.g., a beacon) or associated device (e.g., a paired smartphone) to create maintenance and acquisition cost models. These models allow vehicle manufacturers and/or insurers to offer their customers discounts and/or rewards based on good driving behavior and/or offer their customers certain parameters with which the customers should operate the vehicles such that the vehicles are operated within preferred parameters of the manufacturer and/or insurance company. Currently, insurance companies offer discounts based on how safe a customer drives because better driving behavior lowers risks. In the same respect, some customers' driving habits could make their vehicles less expensive to maintain and/or charge. The computer system described herein may use historical data, including telematics data and vehicle data, to build an algorithm that would allow vehicle manufacturers and insurers the ability to better anticipate future maintenance costs based on how a person operates the vehicle and provide parameters within which they prefer the vehicle to be operated. This model would allow the vehicle manufacturers to discount warranty services, or provide perks for customers that would be predicted to have a lower cost of maintenance based on their driving behavior. If customers wish to operate the vehicle outside of the preferred parameters, the systems and methods described herein provide the manufacturer and/or insurance company the ability to predict the cost of the additional maintenance on the vehicle such that the customer and manufacturer and/or insurer can mutually agree on the costs. Furthermore, vehicle manufacturers who also have public charging networks would be able to offer discounts for customers who drive in a way that leads to less demand on the charging infrastructure. The systems and methods described herein allow customers to pay a single acquisition cost that includes procurement and maintenance costs for the vehicle over a predetermined time period as long as the vehicles are operated within certain parameters, and allow the user to choose the parameters, while assisting vehicle manufacturers in controlling maintenance costs and increasing customer engagement.

Exemplary Computer System

FIG. 1 depicts a simplified block diagram of an exemplary computer system 100. In the exemplary embodiment, system 100 may be used for determining an acquisition cost of a vehicle using a model. In the exemplary embodiment, system 100 may include a modeling computing device 102 and a database server 104. Modeling computing device 102 may be in communication with one or more databases 106 (or other memory devices), client devices 108, and/or third party devices 110.

In the exemplary embodiment, client devices 108 may be computers that include a web browser or a software application, which enables client devices 108 to access remote computer devices, such as modeling computing device 102, using the Internet or other network. More specifically, client devices 108 may be communicatively coupled to modeling computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Client devices 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, client devices 108 may include telematics sensors (e.g., gyroscopes, accelerometers, and GPS) and may transmit telematics data to modeling computing device 102.

A third party device 110 may be communicatively coupled with modeling computing device 102. In some embodiments, third party device 110 may be associated with, or is part of a computer network associated with an insurance provider, a manufacturer, and/or a dealership, or in communication with the insurance provider's, the manufacturer's, or the dealership's computer network (not shown). In other embodiments, third party device 110 may be associated with another third party and is merely in communication with the insurance provider's, the manufacturer's, and/or the dealership's computer network. That is, third party device 110 may be associated with an insurance provider of the user, a manufacturer of the vehicle of the user, and/or a dealership from which the user acquired the vehicle. More specifically, third party device 110 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Third party device 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Database server 104 may be communicatively coupled to database 106 that stores data. In one embodiment, database 106 may include user data associated with users, telematics data of the users, vehicle data associated with the vehicles of the users, maintenance data for a plurality of vehicles, and acquisition costs for a plurality of vehicles, etc. In the exemplary embodiment, database 106 may be stored remotely from modeling computing device 102. In some embodiments, database 106 may be decentralized. In the exemplary embodiment, a user may access database 106 and/or modeling computing device via client device 108.

Modeling computing device 102 may be in communication with a plurality of client devices 108 and third party devices 110 to determine an acquisition cost for a vehicle for a predetermined time period. In some embodiments, modeling computing device 102 may be associated with an insurance provider, manufacturer, and/or dealership or be in communication with the insurance provider's, manufacturer's, and/or dealership's computer network (not shown). In other embodiments, modeling computing device 102 may be associated with a third party and may merely be in communication with the third party device 110.

Exemplary Process for Determining Acquisition Cost

Figure 2:
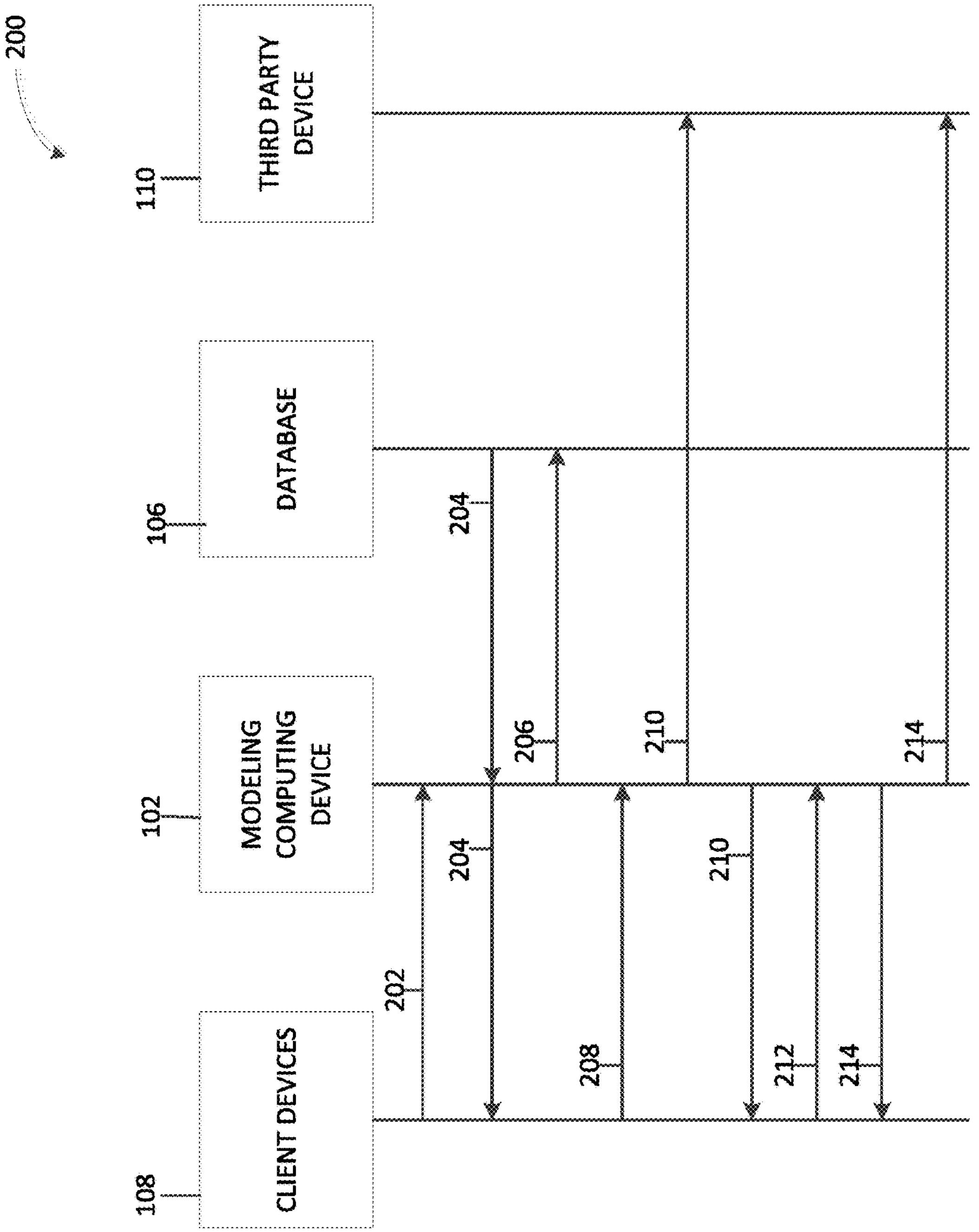
FIG. 2 illustrates a flow chart of an exemplary process that may be carried out by the computer system illustrated in FIG. 1.

FIG. 2 illustrates a flow chart of an exemplary process 200 for determining acquisition costs for one or more users (e.g., associated with client devices 108). Process 200 may be carried out by computer system 100 (shown in FIG. 1).

In the exemplary embodiment, one or more client devices 108 send historical telematics data 202 to modeling computing device 102. Further, modeling computing device 102 retrieves historical vehicle data 204 from database 106. Modeling computing device 102 generates a model 206 based upon historical telematics data 202 and historical vehicle data 204 and stores model 206 in database 106.

When a user wishes to acquire a vehicle, the user transmits a vehicle acquisition request to modeling computing device 102 (e.g., through client device 108). Modeling computing device 102 input vehicle acquisition request 208 and associated data into model 206, and an acquisition cost and associated parameters 210 is determined. Acquisition cost and associated parameters 210 is sent to the user (e.g., through client device 108) and a manufacturer, dealership, and/or insurer (e.g., through third party device 110). The user may adjust acquisition cost and associated parameters 210 and/or accept acquisition cost and associated parameters 210 such that the acquisition transaction between the user and the manufacturer, dealership, and/or insurer can be completed.

Once the user accepts acquisition cost and associated parameters 210, modeling computing device 102 receives current telematics data 212 associated with the user and the vehicle from one or more client devices 108. Using current telematics data 212, modeling computing device 102 determines whether the user stays within parameters 210 for the predetermined time period. If the user stays within parameters 210, modeling computing device 102 may generate a reward or discount (not shown) for the user (e.g., for a subsequent time period). If the user does not stay within parameters 210, modeling computing device 102 determines an additional cost 214 that the user must pay for going outside of parameters 210. Additional cost 214 is sent to the user (e.g., through client device 108) and the manufacturer, dealership, and/or insurer (e.g., through third party device 110) such that additional cost 214 can be settled.

Exemplary Client Device

Figure 3:
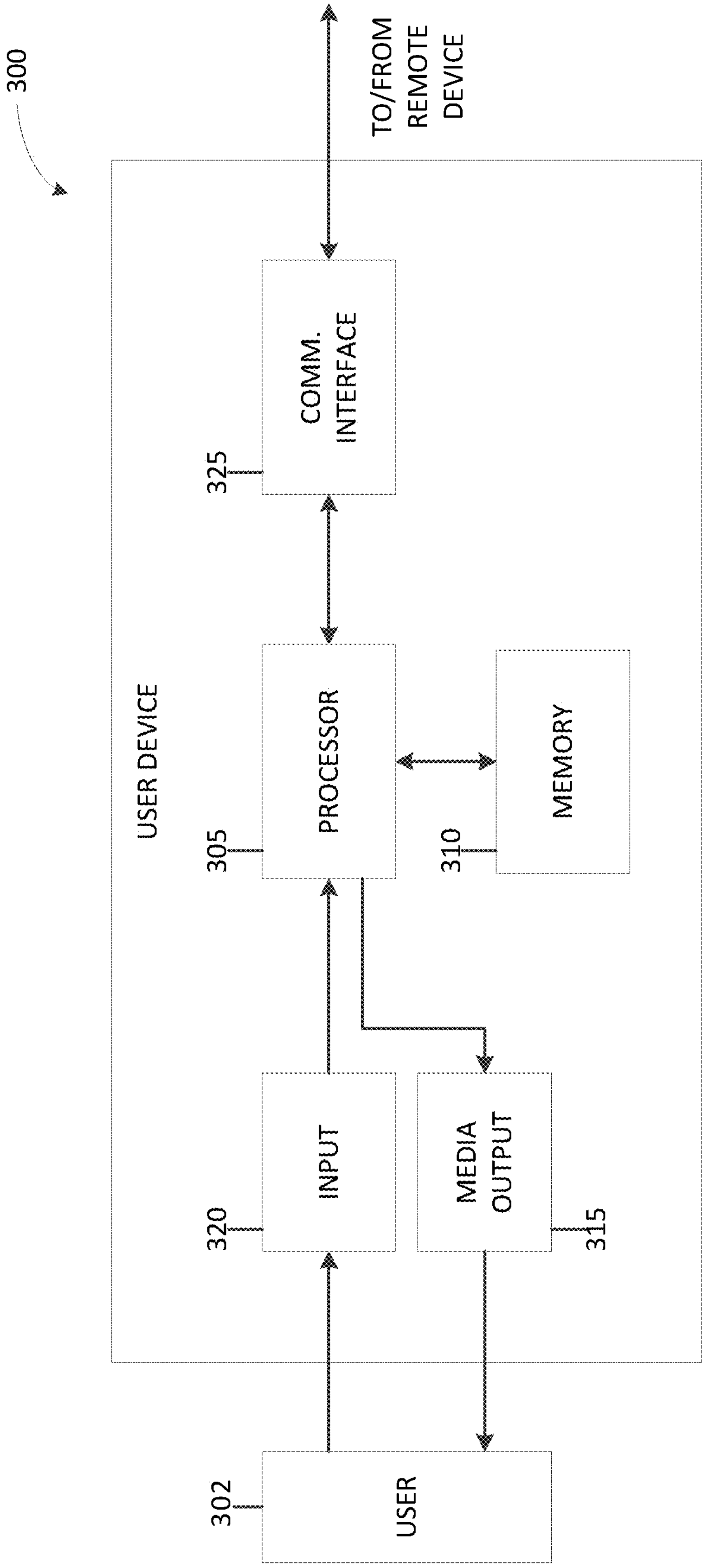
FIG. 3 illustrates an exemplary client computing device that may be used with the exemplary computer system illustrated in FIG. 1.

FIG. 3 depicts an exemplary configuration of a client device 300, such as client device 108, as shown in FIG. 1, and in accordance with one embodiment of the present disclosure. Client device 300 may be operated by a user 302. Client device 300 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer readable media.

Client device 300 may also include at least one media output component 315 for presenting information to user 302. Media output component 315 may be any component capable of conveying information to user 302. In some embodiments, media output component 315 may include an output adapter (not shown) such as a video adapter and/or an audio adapter. An output adapter may be operatively coupled to processor 305 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 302. A graphical user interface may include, for example, an online store interface for viewing and/or purchasing items, and/or a wallet application for managing payment information. In some embodiments, client device 300 may include an input device 320 for receiving input from user 302. User 302 may use input device 320 to, without limitation, select and/or enter data, such as, for example, one or more report criteria or report filters.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

Client device 300 may also include a communication interface 325, communicatively coupled via a network to modeling computing device 102 (shown in FIG. 1). Communication interface 325 may include, for example, a wired or wireless network adapter and/or a wireless data transceiver for use with a mobile telecommunications network.

Stored in memory area 310 are, for example, computer readable instructions for providing a user interface to user 302 via media output component 315 and, optionally, receiving and processing input from input device 320. A user interface may include, among other possibilities, a web browser and/or a client application. Web browsers enable users, such as user 302, to display and interact with media and other information typically embedded on a web page or a website.

Exemplary Server System

Figure 4:
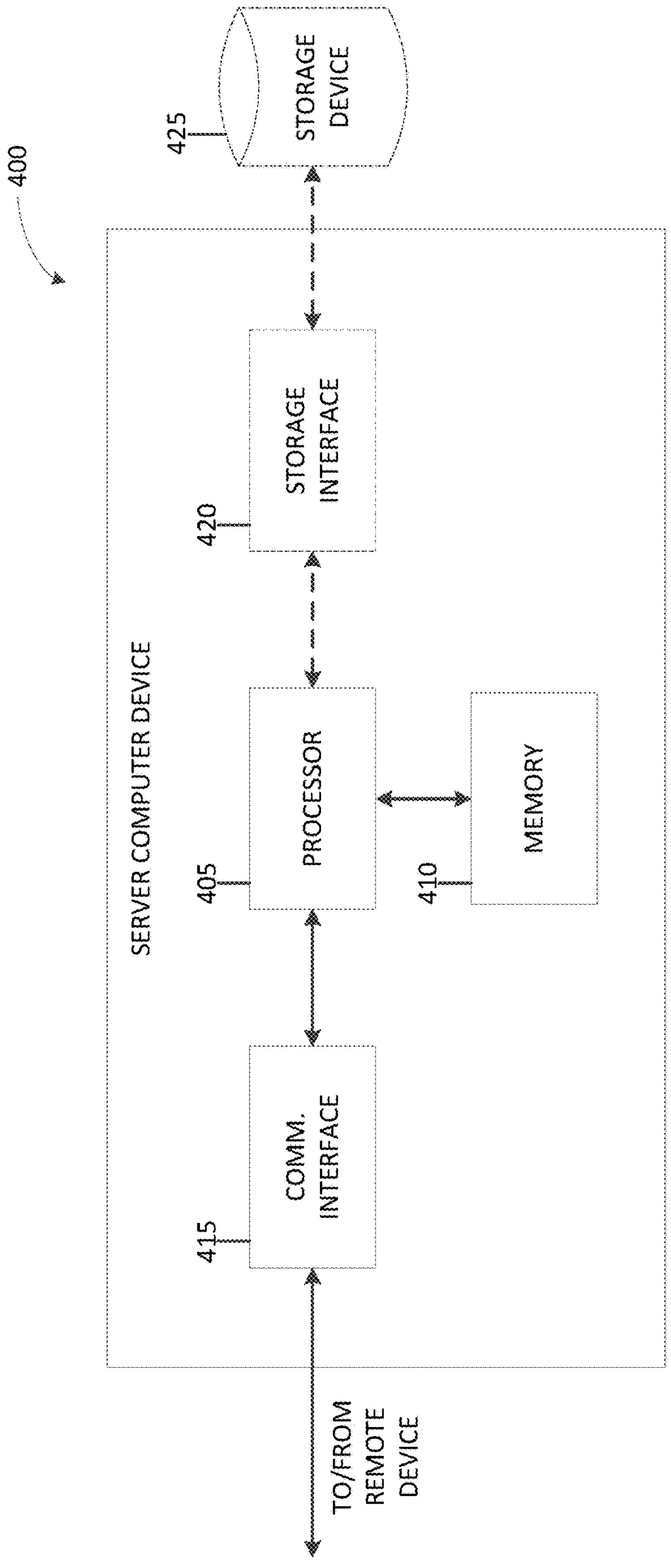
FIG. 4 illustrates an exemplary configuration of a server that may be used in the exemplary computer system illustrated in FIG. 1.

FIG. 4 depicts an exemplary server system 400 such as modeling computing device 102, as shown in FIG. 1, and in accordance with one exemplary embodiment of the present disclosure. Accordingly, server system 400 may include a processor 405 for executing instructions. Instructions may be stored in a memory area 410. Processor 405 may include one or more processing units (e.g., in a multi-core configuration).

Processor 405 may be operatively coupled to a communication interface 415 such that server system 400 is capable of communicating with a remote computing device. For example, communication interface 415 may receive requests from client devices 108 (shown in FIG. 1) via the Internet and/or over a computer network.

Processor 405 may also be operatively coupled to a storage device 425 (e.g., database 106, shown in FIG. 1). Storage device 425 may be any computer-operated hardware suitable for storing and/or retrieving data. In some embodiments, storage device 425 may be integrated in server system 400. For example, server system 400 may include one or more hard disk drives as storage device 425. In other embodiments, storage device 425 may be external to server system 400 and may be accessed by a plurality of server systems 400. For example, storage device 425 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Exemplary Computer Device

Figure 5:
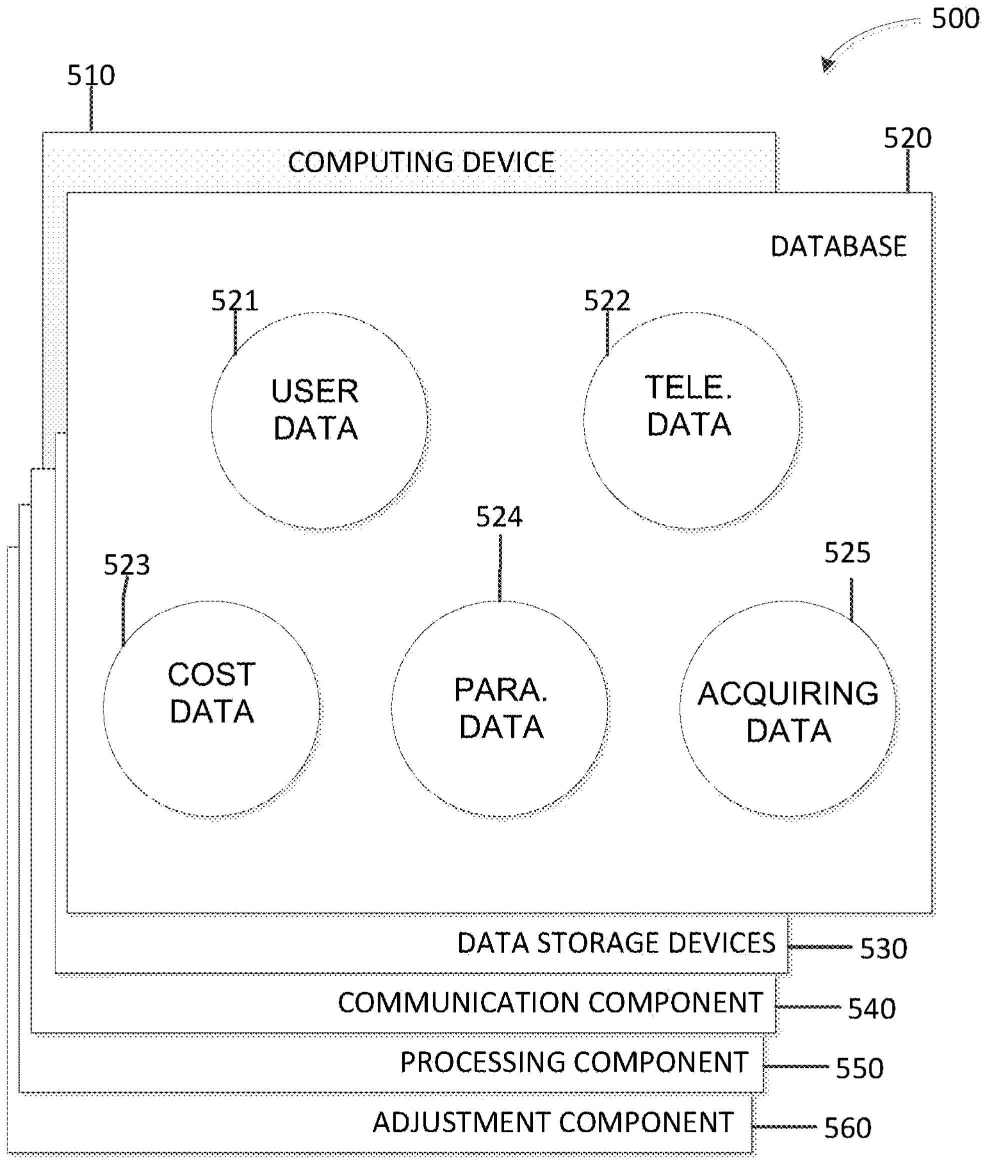
FIG. 5 illustrates a diagram of components of one or more exemplary computing devices that may be used in the exemplary computer system shown in FIG. 1.

FIG. 5 depicts a diagram 500 of components of one or more exemplary computing devices that may be used in system 100 (shown in FIG. 1) and/or to carry out process 200 (shown in FIG. 2).

In some embodiments, computing device 510 may be similar to modeling computing device 102 (shown in FIG. 1). Database 520 may be coupled with several separate components within computing device 510, which perform specific tasks. In this embodiment, database 520 may include user data 521 (e.g., historical driving data including historical telematics data and historical insurance claim data, user information including age, gender, and location, and group data), telematics data 522 (e.g., current and/or historical telematics data of users, including acceleration, braking, cornering, speed, miles, and location information), cost data 523 (e.g., costs associated with procuring the vehicle and acquisition costs), parameter data 524 (e.g., parameters associated with the acquiring cost), and acquiring data 525 (e.g., acquiring cost data and the parameters associated with the acquiring cost). In some embodiments, database 520 is similar to database 106 (shown in FIG. 1).

Computing device 510 may include database 520, as well as a data storage device 530. Computing device 510 may also include a communication component 540 for transmitting and receiving data between modeling computing device 102, client devices 108, and third party devices 110 (shown in FIG. 1). Computing device 510 may further include a processing component 550 that may, for example, process telematics data (e.g., received from client devices 108) and processing the acquiring cost. An adjustment component 560 may assist with adjusting parameters and acquisition cost.

Exemplary Parameters List

FIGS. 6A and 6B illustrate example acquiring costs and a list or "menu" of parameters associated with the acquiring costs. In some embodiments, the lists 600 and 610 may be output to users (e.g., "drivers") by modeling computing device 102 (shown in FIG. 1), and, as described herein, the users may accept or change the parameters and therefore the associated acquiring costs.

List 600 may be generated by modeling computing device 102 in response to a vehicle acquisition request input into the model generated by modeling computing device 102. For example, the vehicle acquisition request may be for a driver wishing to acquire an electric vehicle with at least some autonomous or semi-autonomous functionality that requires below-average maintenance, even in winter months or in hilly or inclined terrain. Modeling computing device 102 may generate list 600 based upon historical telematics data associated with the driver and/or historical telematics associated with drivers similar to the driver that drive similar vehicles. For example, modeling computing device 102 may determine, based upon the historical telematics data, (i) that the driver is relatively safe and low-risk (e.g., by determining that the driver has not been involved in many accidents, does not have many undesirable driving events, etc.), (ii) that the driver does not drive their vehicles off-road, (iii) an amount of mileage typically driven by the driver in a month, and (iv) a terrain that the driver typically drives. Accordingly, list 600 includes relatively low maintenance and insurance costs, and the parameters of list 600 include 1,250 miles, 10 electrical charges, 10 undesirable driving events, 0 off-road driving events, 20% of driving time in autonomous or semi-autonomous mode, the vehicle being operated during summer, fall, or spring, and the vehicle being operated on relatively flat terrain with few inclines. List 600 may further include costs associated with additional undesirable driving events and/or off-road driving events and winter operation. List 600 may be output to the driver, and the driver may accept the acquiring cost and associated parameters and/or modify the parameters such that modeling computing device 102 may determine a new acquiring cost until the driver accepts the acquiring cost.

List 610 may be generated by modeling computing device 102 in response to a vehicle acquisition request input into the model generated by modeling computing device 102. For example, the vehicle acquisition request may be for a driver wishing to acquire a gas-fueled sports car with no autonomous or semi-autonomous functionality that requires above-average maintenance, especially in winter months and when operated on hilly terrain. Modeling computing device 102 may generate list 610 based upon historical telematics data associated with the driver and/or historical telematics associated with drivers similar to the driver that drive similar vehicles. For example, modeling computing device 102 may determine, based upon the historical telematics data, (i) that the driver is relatively unsafe and high-risk (e.g., by determining that the driver has been involved in one or more accidents, has many undesirable driving events, etc.), (ii) that the driver typically drives their vehicles off-road at least once a month, (iii) an amount of mileage typically driven by the driver in a month, and (iv) a terrain that the driver typically drives. Accordingly, list 610 includes relatively high maintenance and insurance costs, and the parameters of list 610 include 1,675 miles, 5 gas tank fill-ups (e.g., that are provided to the driver in the form of a prepaid gas card), 30 undesirable driving events, 1 off-road driving event, the vehicle being operated during summer, fall, or spring, and the vehicle operated on relatively flat terrain. List 610 may further include costs associated with additional undesirable driving events and/or off-road driving events and winter operation. List 610 may be output to the driver, and the driver may accept the acquiring cost and associated parameters and/or modify the parameters such that modeling computing device 102 may determine a new acquiring cost until the driver accepts the acquiring cost.

Lists 600 and 610 are shown as exemplary "menus" associated with the acquiring cost output by modeling computing device 102, as described herein. In further embodiments, lists output by modeling computing device 102 may include additional or less information and/or parameters. For example, in other embodiments, lists 600 and 610 may include parameters including a maximum percentage of time the vehicle is driven at night or more specific off-road events including racetrack events. Further, in other embodiments, lists 600 and 610 may be generated for different predetermined time periods including, for example, two months, six months, a year, etc.

Exemplary Computer-Implemented Method

Figure 7:
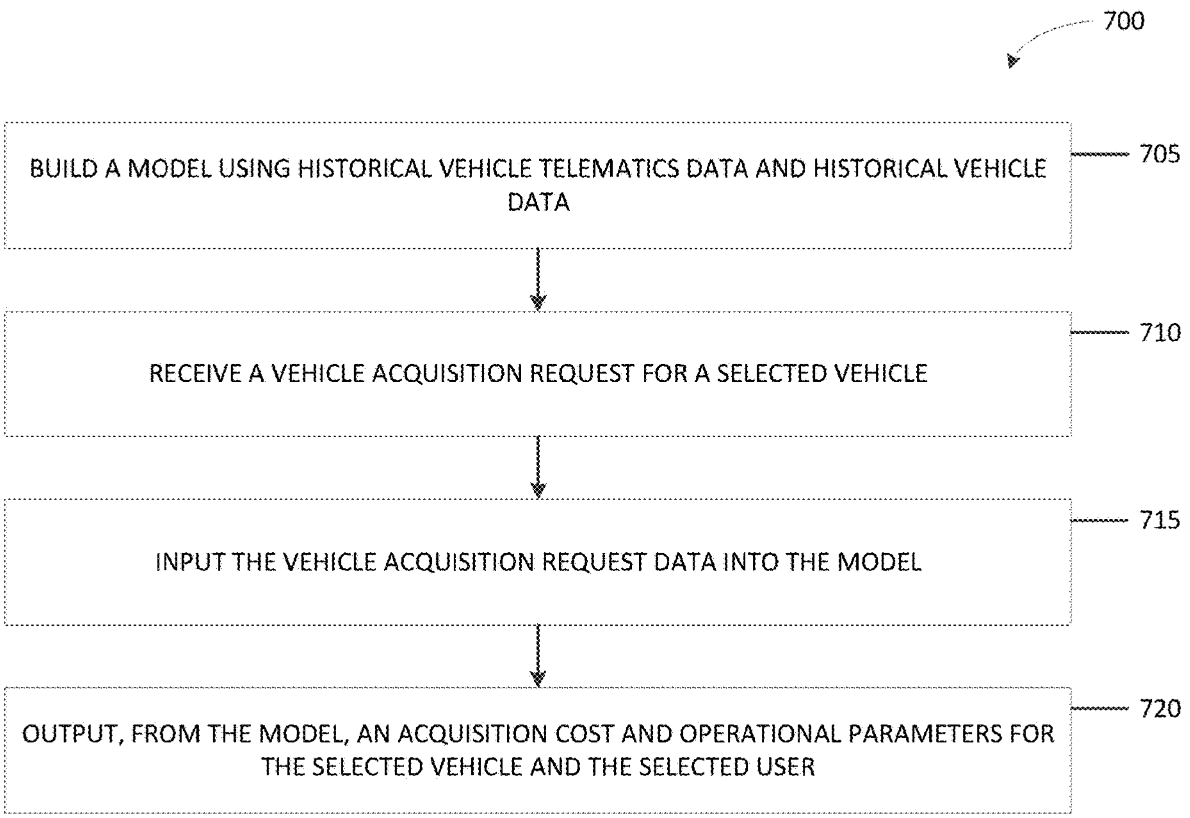
FIG. 7 illustrates a flow chart of an exemplary computer-implemented process that may be carried out by the exemplary computer system shown in FIG. 1.

FIG. 7 illustrates a flow chart of an exemplary computer-implemented process 700 for building a model based upon historical telematics and vehicle data and utilizing the model to output an acquisition cost and parameters associated with the acquisition cost for a vehicle. Process 700 may be implemented, at least in part, by a computing device/server, for example, modeling computing device 102 (shown in FIG. 1).

Process 700 may include building 705 (e.g., by modeling computing device 102) a model using historical vehicle telematics data and historical vehicle data. Historical vehicle telematics data may include data associated with operation of the vehicle including one or more vehicle components, including acceleration, braking, cornering, vehicle mileage, a tread depth of one or more vehicle tires, an environmental sensor reading, vehicle oil and fluid levels, tire pressure, tire temperature, and vehicle brake pad thicknesses. Historical vehicle data may include vehicle type data (e.g., a make of the vehicle, a model of the vehicle, and a vehicle group of the vehicle) and user data associated with operators of the vehicle, including driving history of the users. The model may be configured to (i) predict an operating cost of a vehicle based upon a vehicle type and user data and (ii) output operational parameters for operating the vehicle.

A vehicle acquisition request for a selected vehicle may be received 710 (e.g., by modeling computing device 102). The vehicle acquisition request may include vehicle data for the selected vehicle and selected user data for the user of the selected vehicle. Data of the vehicle acquisition request may be input 715 (e.g., by modeling computing device 102) into the model for the selected vehicle.

Further, process 700 may include outputting (e.g., by modeling computing device 102) from the model an acquisition cost and operational parameters for the selected vehicle and the selected user. The acquisition cost may include a procurement cost for the selected vehicle and an operating cost for operating the selected vehicle within the operational parameters and for a predetermined time period (e.g., a month, two months, six months, a year, etc.).

Exemplary Embodiments & Functionality

In one aspect, a computing system including a processor in communication with at least one memory may be provided. The processor may be configured to: (i) build a model using historical vehicle telematics data and historical vehicle data, the model configured to: (a) predict an operating cost of a vehicle based upon a vehicle type and user data and (b) output operational parameters for operating the vehicle, (ii) receive a vehicle acquisition request for a selected vehicle, the vehicle acquisition request including vehicle data for the selected vehicle and selected user data for the user of the selected vehicle, (iii) input the vehicle acquisition request data into the model for the selected vehicle, and/or (iv) output from the model an acquisition cost and operational parameters for the selected vehicle and the selected user, the acquisition cost including a procurement cost for the selected vehicle and an operating cost for operating the selected vehicle within the operational parameters and for a predetermined time period. The computer system may include additional, less, or alternate functionality, including that discussed elsewhere herein.

For example, the processor may be further configured to (i) receive, from one or more sensors, the historical vehicle telematics data associated with the plurality of vehicles, (ii) retrieve, from the at least one memory, the historical vehicle data associated with the plurality of vehicles, wherein the historical vehicle data includes at least one of (a) vehicle type data, (b) user data associated with a user of each of the plurality of vehicles, and (c) historical operating costs, wherein the historical operating costs include procurement costs and maintenance costs associated with each of the plurality of vehicles, and/or (iii) link the historical vehicle telematics data and the historical vehicle data for each vehicle of the plurality of vehicles and each user of the plurality of vehicles.

The operational parameters may include (i) a predetermined number of electrical charges or gas tank fill-ups, (ii) a maximum number of undesirable driving events, the undesirable driving events including at least one of a hard braking event, a hard cornering event, and a hard acceleration event, (iii) a maximum number of off-road events, (iv) if the vehicle is an autonomous or semi-autonomous vehicle, a maximum amount of time the vehicle is set to a non-autonomous mode, (v) one or more seasons in which the vehicle is being operated during the predetermined time period, (vi) one or more terrains in which the vehicle is being operated during the predetermined time period, (vii) a maximum number of miles driven by the vehicle during the predetermined time period, and (viii) a maximum number of racetrack driving events.

The processor may be further configured to: (i) display the acquisition cost and operational parameters associated with the acquisition cost for the selected vehicle to the selected use, (ii) prompt the selected user to one of (a) approve the acquisition cost and operational parameters and (b) adjust the operational parameters, (iii) in response to receiving adjustments to the operational parameters, adjust the acquisition cost based upon the operational parameters adjustments, (iv) receive, from one or more sensors, current telematics data associated with the selected vehicle, wherein the one or more sensors include telematics sensors, gyroscopes, accelerometers, global positioning system (GPS) sensors, and sensors configured to monitor one or more vehicle components, (v) determine, based upon the current telematics data, whether the selected vehicle was operated within each of the parameters associated with the acquisition cost of the selected vehicle during the predetermined amount of time, (vi) if the selected vehicle was operated within each of the parameters during the predetermined time period, determine (a) a discount to the acquisition cost of the selected vehicle to be applied to a subsequent predetermined time period or (b) a reward for the selected user of the selected vehicle, (vii) if the selected vehicle was not operated within at least one of the parameters during the predetermined time period, determine an additional cost associated with selected vehicle operating outside of the at least one parameter, (viii) display the current telematics data to the selected user, (ix) determine, based upon the current telematics data, that the selected user of the selected vehicle is close to exceeding one or more parameters associated with the acquisition cost of the selected vehicle, and/or (x) transmit a notification to the selected user of the selected vehicle that the selected user is close to exceeding the one or more parameters.

The processor may also be configured to provide at least one of a prepaid card, a digital wallet credit, and an account credit to cover the maintenance cost of at least one of the parameters. Further, the vehicle telematics data may include data associated with operation of the vehicle including one or more vehicle components, including acceleration, braking, cornering, vehicle mileage, a tread depth of one or more vehicle tires, an environmental sensor reading, vehicle oil and fluid levels, tire pressure, tire temperature, and vehicle brake pad thicknesses. The vehicle type data may include a make of the vehicle, a model of the vehicle, and a vehicle group of the vehicle, wherein the vehicle group includes at least one of a sports type, a passenger type, a sedan type, and a motorcycle type. The user data may include a driving history of the user.

In another embodiment, a computer-implemented method implemented by a computing system including a processor in communication with at least one memory may be provided. The method may include: (i) building a model using historical vehicle telematics data and historical vehicle data, the model configured to: (a) predict an operating cost of a vehicle based upon a vehicle type and user data and (b) output operational parameters for operating the vehicle, (ii) receiving a vehicle acquisition request for a selected vehicle, the vehicle acquisition request including vehicle data for the selected vehicle and selected user data for the user of the selected vehicle, (iii) inputting the vehicle acquisition request data into the model for the selected vehicle, and/or (iv) outputting from the model an acquisition cost and operational parameters for the selected vehicle and the selected user, the acquisition cost including a procurement cost for the selected vehicle and an operating cost for operating the selected vehicle within the operational parameters and for a predetermined time period. The method may include additional, less, or alternate actions, including those discussed elsewhere herein.

In yet another embodiment, at least one non-transitory computer-readable storage media having computer-executable instructions embodied thereon may be provided. When executed by at least one processor in communication with at least one memory device, the computer-executable instructions may cause the processor to: (i) build a model using historical vehicle telematics data and historical vehicle data, the model configured to: (a) predict an operating cost of a vehicle based upon a vehicle type and user data and (b) output operational parameters for operating the vehicle, (ii) receive a vehicle acquisition request for a selected vehicle, the vehicle acquisition request including vehicle data for the selected vehicle and selected user data for the user of the selected vehicle, (iii) input the vehicle acquisition request data into the model for the selected vehicle, and/or (iv) output from the model an acquisition cost and operational parameters for the selected vehicle and the selected user, the acquisition cost including a procurement cost for the selected vehicle and an operating cost for operating the selected vehicle within the operational parameters and for a predetermined time period. The instructions may direct additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models (e.g., maintenance, charging, and/or pricing models, which may be part of a single model or be separate models) may be created based upon example inputs in order to make valid and reliable predictions for novel inputs.

Additionally or alternatively, the machine learning programs may be trained by inputting sample data sets or certain data into the programs, such as vehicle telematics data, and/or industry vehicle maintenance data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. In one embodiment, the system includes a plurality of virtual computing devices (e.g., virtual machines) in a cloud configuration, such that the virtual computing devices may be dynamically allocated. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112 (f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computing system for determining whether a vehicle is operating within operational parameters, the computing system comprising at least one processor in communication with at least one memory, the at least one processor configured to:

receive vehicle data for a selected vehicle and user data for a user of the selected vehicle, wherein the user data includes historical telematics data associated with the user;

input the vehicle data and the user data into a model;

output, from the model, vehicle operational parameters for operating the selected vehicle;

display, through an application executing on a user device of the user, the vehicle operational parameters, wherein displaying the vehicle operational parameters includes displaying a message requesting the user to approve the vehicle operational parameters; and in response to receiving, from the application, an approval of the vehicle operational parameters:

receive, from one or more telematics sensors associated with the selected vehicle, current telematics data;

determine, based upon the current telematics data, whether the selected vehicle is being operated by the user within the vehicle operational parameters; and cause a dashboard to be displayed through the application on the user device, wherein the dashboard includes the current telematics data and the determination of whether the selected vehicle is being operated within the vehicle operational parameters.

2. The computing system of claim 1, wherein the at least one processor is further configured to:

receive, from one or more telematics sensors associated with a plurality of vehicles, historical vehicle telematics data associated with the plurality of vehicles.

3. The computing system of claim 2, wherein the at least one processor is further configured to:

build the model using the historical vehicle telematics data and historical vehicle data associated with the plurality of vehicles, the model configured to output operational parameters for operating at least one vehicle of the plurality of vehicles and a cost to operate the at least one vehicle within the operational parameters for operating the at least one vehicle.

4. The computing system of claim 1, wherein the at least one processor is further configured to, in response to receiving, from the application, the approval of the vehicle operational parameters, analyze the current telematics data.

5. The computing system of claim 1, wherein the at least one processor is further configured to output, from the model, an operating cost to operate the selected vehicle within the vehicle operational parameters for a predetermined time period.

6. The computing system of claim 5, wherein the at least one processor is further configured to:

output from the model an acquisition cost for the selected vehicle, the acquisition cost including a procurement cost for the selected vehicle and the operating cost for operating the selected vehicle within the vehicle operational parameters and for the predetermined time period.

7. The computing system of claim 1, wherein the message further requests the user to adjust the vehicle operational parameters, and wherein the at least one processor is further configured to, in response to receiving, from the application, one or more adjustments to the vehicle operational parameters:

input the one or more adjustments to the vehicle operational parameters into the model; and update the model based upon the one or more adjustments to the vehicle operational parameters.

8. A computer-implemented method implemented by a computing system for determining whether a vehicle is operating within operational parameters, the computing system including at least one processor in communication with at least one memory, the method comprising:

receiving vehicle data for a selected vehicle and user data for a user of the selected vehicle, wherein the user data includes historical telematics data associated with the user;

inputting the vehicle data and the user data into a model;

outputting, from the model, vehicle operational parameters for operating the selected vehicle;

displaying, through an application executing on a user device of the user, the vehicle operational parameters, wherein displaying the vehicle operational parameters includes displaying a message requesting the user to approve the vehicle operational parameters; and in response to receiving, from the application, an approval of the vehicle operational parameters:

receiving, from one or more telematics sensors associated with the selected vehicle, current telematics data;

determining, based upon the current telematics data, whether the selected vehicle is being operated by the user within the vehicle operational parameters; and causing a dashboard to be displayed through the application on the user device, wherein the dashboard includes the current telematics data and the determination of whether the selected vehicle is being operated within the vehicle operational parameters.

9. The computer-implemented method of claim 8 further comprising:

receiving, from one or more telematics sensors associated with a plurality of vehicles, historical vehicle telematics data associated with the plurality of vehicles.

10. The computer-implemented method of claim 9 further comprising:

building the model using the historical vehicle telematics data and historical vehicle data associated with the plurality of vehicles, the model configured to output operational parameters for operating at least one vehicle of the plurality of vehicles and a cost to operate the at least one vehicle within the operational parameters for operating the at least one vehicle.

11. The computer-implemented method of claim 8 further comprising, in response to receiving, from the application, the approval of the vehicle operational parameters, analyzing the current telematics data.

12. The computer-implemented method of claim 8 further comprising outputting, from the model, an operating cost to operate the selected vehicle within the vehicle operational parameters for a predetermined time period.

13. The computer-implemented method of claim 12 further comprising:

outputting from the model an acquisition cost for the selected vehicle, the acquisition cost including a procurement cost for the selected vehicle and the operating cost for operating the selected vehicle within the vehicle operational parameters and for the predetermined time period.

14. The computer-implemented method of claim 8, wherein the message further requests the user to adjust the vehicle operational parameters, and wherein the method further comprises, in response to receiving, from the application, one or more adjustments to the vehicle operational parameters:

inputting the one or more adjustments to the vehicle operational parameters into the model; and updating the model based upon the one or more adjustments to the vehicle operational parameters.

15. At least one non-transitory computer-readable storage medium having computer-executable instructions embodied thereon, wherein when executed by at least one processor for determining whether a vehicle is operating within operational parameters, the at least one processor in communication with at least one memory, the computer-executable instructions cause the at least one processor to:

receive vehicle data for a selected vehicle and user data for a user of the selected vehicle, wherein the user data includes historical telematics data associated with the user;

input the vehicle data and the user data into a model;

output, from the model, vehicle operational parameters for operating the selected vehicle;

display, through an application executing on a user device of the user, the vehicle operational parameters, wherein displaying the vehicle operational parameters includes displaying a message requesting the user to approve the vehicle operational parameters; and in response to receiving, from the application, an approval of the vehicle operational parameters:

receive, from one or more telematics sensors associated with the selected vehicle, current telematics data;

determine, based upon the current telematics data, whether the selected vehicle is being operated by the user within the vehicle operational parameters; and cause a dashboard to be displayed through the application on the user device, wherein the dashboard includes the current telematics data and the determination of whether the selected vehicle is being operated within the vehicle operational parameters.

16. The computer-readable storage medium of claim 15, wherein the computer-executable instructions further cause the at least one processor to:

receive, from one or more telematics sensors associated with a plurality of vehicles, historical vehicle telematics data associated with the plurality of vehicles.

17. The computer-readable storage medium of claim 16, wherein the computer-executable instructions further cause the at least one processor to:

build the model using the historical vehicle telematics data and historical vehicle data associated with the plurality of vehicles, the model configured to output operational parameters for operating at least one vehicle of the plurality of vehicles and a cost to operate the at least one vehicle within the operational parameters for operating the at least one vehicle.

18. The computer-readable storage medium of claim 15, wherein the computer-executable instructions further cause the at least one processor to, in response to receiving, from the application, the approval of the vehicle operational parameters, analyze the current telematics data.

19. The computer-readable storage medium of claim 15, wherein the computer-executable instructions further cause the at least one processor to output, from the model, an operating cost to operate the selected vehicle within the vehicle operational parameters for a predetermined time period.

20. The computer-readable storage medium of claim 15, wherein the message further requests the user to adjust the vehicle operational parameters, and wherein the computer-executable instructions further cause the at least one processor to, in response to receiving, from the application, one or more adjustments to the vehicle operational parameters:

input the one or more adjustments to the vehicle operational parameters into the model; and update the model based upon the one or more adjustments to the vehicle operational parameters.

* * * * *